United States Patent Office

2,996,563
OXIDATION RESISTANT FORMED NEGATIVE ELECTRODES FOR LEAD STORAGE BATTERIES AND PROCESS OF MAKING SAME
Herbert Haebler, Frankfurt am Main, Germany, assignor to Accumulatoren-Fabrik Aktiengesellschaft, Hagen, Westphalia, Germany, a corporation of Germany
No Drawing. Filed May 28, 1959, Ser. No. 816,377
Claims priority, application Germany May 30, 1958
13 Claims. (Cl. 136—27)

The present invention relates to oxidation resistant formed negative electrodes for storage batteries and to a process of making the same.

More particularly, the present invention relates to improved oxidation resistant, formed negative electrodes and to a process of preventing the oxidation of such electrodes.

It is known that freshly formed negative sponge lead plates burn when dried on air. This oxidation process proceeds with an especially high speed when a three-phase boundary line is formed on the negative plate, i.e., when the relation of lead sponge to atmospheric oxygen and water is especially favorable for oxidation. Attempts have been made to exclude the action of atmospheric oxygen during drying of the formed negative electrode and afterwards by a treatment with various chemicals. The following chemicals have been suggested for this purpose:

(1) Drying with the exclusion of oxygen, for instance, drying in a vacuum or in combustion gases that are free of oxygen, or drying in super-heated steam.

(2) Evaporation of the water by dipping the plates into high boiling liquids at temperatures above 100° C.

(3) Coating with impregnating agents applied by immersion which agents protect the lead sponge from air oxidation and permit drying with hot air.

The last mentioned drying method, according to which the negative plates are protected by means of impregnating agents applied by immersion is especially useful as this process is quite simple and more economical than the other drying processes mentioned above. It has been proposed to protect the negative plates against oxidation by means of aniline, dextrin, glucose, glycerol, glycol, phenol, cresol, starch sugar, glues, soaps, cane sugar, or starch. All these known impregnating agents applied by immersion are organic substances which, as is assumed, cover the negative plates with a protective coating. These known protecting agents, however, do not have a fully reliable protecting effect against oxygen as, in most cases, they do not completely prevent oxidation of the negative plate during drying and afterwards. This can be proved by the determination of lead oxide within the dried plates. Furthermore, the stability, on storage, of plates treated with such agents is rather unsatisfactory. In addition thereto such organic compounds exhibit the unfavorable property that they are oxidized at the positive electrode during discharge of the storage battery, thereby causing formation of compounds which are harmful to the storage battery, such as acetic acid or nitric acid, when the agent contains nitrogen. Due to such oxidation the capacity of the positive plate is also temporarily reduced. Furthermore, when using many of said drying agents, it is not possible to increase the drying temperature substantially above 100° C. as otherwise these compounds evaporate or burn whereby their efficiency will be reduced. The above mentioned agents have the further disadvantage that they will cause discoloration of the electrolyte or that they will produce oily deposits on the electrolyte, that they have an undesirable odor, cause corrosion, and/or will precipitate in flake form when the acid electrolyte is filled into the storage battery. Due thereto the initial capacity of the storage battery will be unfavorably affected.

It is one object of the present invention to provide negative plates of lead sponge which are effectively protected against oxidation after their formation and which do not show the above mentioned disadvantages.

Another object of the present invention is to provide negative electrodes of spongy lead which have a high stability on storage without an increase in oxide content and without decrease in capacity.

Still another object of the present invention is to provide a process of preparing such plates.

These and other objects of the present invention and advantageous features thereof will become more apparent as the description proceeds.

In principle these objects of the present invention are achieved by impregnating negative electrodes with a boric acid solution by dipping or spraying.

Treatment with boric acid has a surprisingly favorable effect as an agent for preventing oxidation and is far superior to agents heretofore used for this purpose as they are mentioned hereinabove. For instance, on using solutions of boric acid as impregnating agents and infrared drying at 105° C. residual capacities are obtained which are substantially equal to the rated capacities of the plates. In any case the values of the residual capacity of plates which had been impregnated with boric acid are substantially higher than those of plates which had been impregnated with phenol or other organic agents applied by immersion mentioned above.

The use of boric acid as an impregnating agent according to the present invention has the great advantage over the organic substances mentioned hereinabove that boric acid is not burnt on the positive plate during charging and discharging and, therefore, the residual capacity of the positive plate is not unfavorably affected by the impregnating agent. The inorganic nature of the impregnating agent according to the present invention permits operation at a drying temperature which need not be just a few degrees above 100° C. but may be substantially higher, as the impregnating agent does not burn even at high temperatures and as, due thereto, no decrease in protective activity occurs. Another advantage of the use of boric acid as impregnating agent is its being nonhygroscopic and odorless, that it will not cause discoloration of the electrolyte and, furthermore, that it is rather difficultly soluble in water, but easily soluble in the electrolyte. A further advantage of the impregnating agent according to the present invention consists in the fact that during operation of the storage battery no harmful substances, such as acetic acid or nitric acid, will be formed.

The impregnating solutions according to the present invention can be applied within a relatively broad range of concentration. Favorable results are obtained by using 5 g. to 100 g. of boric acid per liter of solution. It is preferred, however, to use concentrations of about 50 g. of boric acid per liter of solution.

The resulting formed sponge lead negative electrodes contain uniformly distributed throughout their porous structure between about 0.5% and about 1.5% of boric acid, calculated on the sponge lead.

According to another embodiment of the present invention improved results are obtained when carrying out the impregnating treatment with boric acid at a higher temperature, preferably at a temperature between 55° C. and 65° C. On impregnation at a higher temperature the duration of impregnation is substantially reduced while, at the same time, the effect of the impregnating agent is improved significantly.

The impregnating solution may contain, in addition to boric acid, small amounts of weakly acid organic compounds, such as phenol, cresol, and the like. Likewise small amounts of high molecular organic compounds, such as methyl cellulose, or the like, may be added to the impregnating solution. By adding only a small amount of these substances to the said solution, the above mentioned disadvantages ordinarily caused by such other organic impregnating agents become less pronounced. Amounts between about 10 g. and about 30 g. per liter boric solution have been added without causing any disadvantages.

The impregnating agent according to the present invention may be used in such a manner that the negative plates, after formation in the usual manner, are washed in running water and are then immersed in a solution of the impregnating agent, whereupon the plates are dried either in a drying oven or directly in air. The impregnating agent may also be applied by spraying. This manner of impregnation is of great advantage in assembly line production.

In place of aqueous boric acid solutions, there can also be used solutions of boric acid in organic solvents, such as alcohols. The inorganic nature of boric acid provides the possibility of using the impregnating solution as electrolyte during the formation of the negative electrodes so that two processing steps, namely washing and immersion or, respectively, spraying, are omitted.

A special embodiment of the process according to the present invention consists in using the impregnating solution as forming electrolyte whereby stronger acids, such as sulfuric acid, or salts of acid reaction in aqueous solutions, such as aluminum sulfate may be added. In special cases it can be of advantage to form the negative electrodes alone in boric acid solutions without other additions against a counter-electrode which is insoluble in the electrolyte, such as carbon or graphite.

The following examples serve to illustrate the present invention without, however, limiting the same thereto.

EXAMPLE 1

A 5% boric acid solution is filled into the container provided for immersion treatment of the negative electrode plates. Additional undissolved boric acid is filled into the container and forms a sediment therein. The amount of said undissolved boric acid is such that the boric acid concentration during immersion treatment remains constant. The negative plates are introduced and immersed after formation and rinsing with water into the boric acid solution and are kept therein for a period of time as given hereinafter in Table 2, while maintaining the temperature at 20° C.±2° C. The impregnated plates removed from the boric acid solution are then dried in air by means of infrared irradiation whereby hot air of 80° C. is blown between the infrared plates so that the drying temperature is between about 95° C. and about 105° C. Drying is completed within about 5 minutes. Thereafter, the residual capacity of the treated plate was measured and compared with the residual capacity of untreated plates and of plates treated with 2% phenol solutions with 2% bone glue solutions (see Table 1 hereinafter).

The negative electrode plates treated by immersion into boric acid solution are of mouse gray color. They are much more readily wettable than when using organic immersion agents such as phenol.

The capacity values given in the third column of said table indicate the resistance of immersed and dried negative electrodes at 60° C. exposed to 1 l. of moist oxygen per plate. The residual capacity was determined by placing the negative plate between two positive plates and discharging the negative plate by a discharge current for 20 hours until the voltage was decreased to 0.6 volt.

Table 1

| Immersing Agent | Residual capacity of negative plates in ampere-hours | |
|---|---|---|
| | Dried by means of infrared irradiation | Oxidized by means of moist oxygen at 60° C. |
| Untreated plates | 2.3 | 0.9 |
| 2% phenol | 12.5 | 10.2 |
| 2% bone glue | 11.0 | 10.0 |
| 1% boric acid | 15.2 | 12.3 |
| 2% boric acid | 15.3 | 14.4 |
| 3% boric acid | 16.2 | 16.0 |
| 4% boric acid | 16.6 | 16.6 |
| 5% boric acid | 17.0 | 16.5 |

It is evident that boric acid treatment has a very favorable effect on formed negative electrodes which effect is especially pronounced with boric acid concentrations between 3% and 5%.

As stated above, the duration of treatment is given in the following Table 2. When operating at room temperature, 5 g. of boric acid are soluble in 100 cc. of water and no higher concentrations can be produced. When operating at a higher temperature concentrations exceeding 5% of boric acid can be obtained. However, it was found that such higher concentrations do not yield substantially better results than 5% boric acid solutions. Because, when operating with 5% boric acid at higher temperature, no sediment remains, the concentration of the boric acid solution continually changes during immersion treatment. Therefore, in order to obtain comparable results, all the comparative experiments were carried out at a temperature of 20° C.±2° C. and with an additional amount of undissolved boric acid sediment so as to compensate for changes in concentration due to absorption of boric acid by the electrodes.

Table 2

| Thickness of the electrode plate, mm. | Duration of immersion in minutes | | |
|---|---|---|---|
| | Without agitation of the plates | With agitation of the plates | On application by spraying |
| 1 | 15 to 20 | 10 to 15 | 5 to 10. |
| 2 | 25 to 30 | 15 to 20 | 5 to 10. |
| 5 | not more than 45 | not more than 30 | 10 to 15. |

It is evident that the duration of immersion does not increase in proportion to the thickness of the negative electrode plate because in general only the surface of the plate is to be protected.

It is, of course, also possible to carry out the immersion process in boiling boric acid solution of any practically useful concentration. Thereby the duration of immersion will be reduced considerably. For instance, a negative electrode plate of a thickness of 5 mm. need be immersed at said temperature and boric acid concentration for 10 minutes to 15 minutes only to produce the desired result.

When applying the boric acid solution by spraying, it is of advantage to use higher concentrated, warm boric acid solutions in order to compensate for the residual water content of formed and rinsed negative electrode plates which water content amounts to about 10 cc. to 15 cc. in a plate of an average surface area of about 3 square decimeter to about 4 square decimeter. Plates of such a size are sprayed with a 5% to 15% boric acid solution of a temperature between 50° C. and 80° C. which solution is continuously recycled. Each plate absorbs on spraying between about 5 cc. and about 10 cc. of such a boric acid solution. The oxidation protecting effect is about the same as achieved by immersion treatment.

EXAMPLE 2

When using 5% boric acid solution and operating at 60° C., the residual capacity given in Table 3 was measured. Drying was effected at about 105° C. in a drying oven provided with a hood for the escaping water vapor.

*Table 3*

| Immersing agent and temperature | Immersing duration in minutes | Residual capacity of negative plates in ampere-hours | |
|---|---|---|---|
| | | Dried at 105° C. | Oxidized by means of moist oxygen at 60° C. |
| 5% boric acid at 60° C. | 20 | 16.5 | 16.2 |
| 5% boric acid at 20° C. | 40 | 16.4 | 16.0 |

EXAMPLE 3

The negative electrode plate is first immersed at 20° C.±2° C. in 5% boric acid solution for 40 minutes and then in a 3% phenol solution for 30 minutes. The residual capacity of electrodes treated in this manner is between 15.5 ampere-hours and 15.4 ampere-hours.

EXAMPLE 4

The negative electrode plate is first immersed at 20° C.±2° C. into a 3% phenol solution for 30 minutes and then into a 5% boric acid solution for 40 minutes. The residual capacity of electrodes treated in this manner is at about 16.6 ampere-hours.

EXAMPLE 5

(a) When immersing negative electrode plates into a solution of 2.5% of boric acid and 2.5% of phenol at 80° C. and drying the treated plates at 95° C., their lead monoxide (PbO) content is 7.66%.

(b) When immersing such plates into a 2.5% phenol solution at 80° C. and drying the treated plates at 95° C. their lead monoxide (PbO) content is 14.3%.

(c) When immersing such plates into a 5% boric acid solution at 80° C. and drying the treated plates at 95° C., their lead monoxide content decreased to 5.05%, i.e., is much lower than the lead monoxide content of the plates prepared according to Examples 5(a) and 5(b).

EXAMPLE 6

A negative electrode plate is immersed at 20° C.±2° C. into a solution of 5% boric acid and 0.5% methyl cellulose as it is sold under the trademark "Glutolin." The lead monoxide content of such a treated plate is about half as high as that prepared by immersion in a 0.5% methyl cellulose solution. Such a combination treatment has the advantage that the storability of the negative plates under normal conditions is very considerably increased.

EXAMPLE 7

The following Table 4 shows the results achieved when treating negative electrode plates according to the present invention with 5% boric acid solution at 80° C., in comparison with plates treated with a 5% glycerol solution at 80° C.

*Table 4*

| Immersing agent | Duration, minutes | Temperature, ° C. | Lead monoxide content after infrared drying, percent | Protective effect against moist oxygen |
|---|---|---|---|---|
| 5% boric acid | 30 | 80 | 6.05 | excellent. |
| 5% glycerol | 30 | 80 | 10.92 | almost non-existent. |

EXAMPLE 8

Negative electrode plates are formed in the usual manner in a sulfuric acid solution containing 3.2% of sulfuric acid and 5% of boric acid. The residual capacity of such formed plates is 16.3 ampere-hours and after oxidation with moist oxygen as described hereinabove, 16.0 ampere-hours.

EXAMPLE 9

Negative electrodes are formed in the usual manner in a sulfuric acid solution containing 1.0% of aluminum sulfate, 1.6% of sulfuric acid, and 5% of boric acid. The lead monoxide content of such plates is only 4.82%.

EXAMPLE 10

The same advantageous results are achieved as in Examples 8 and 9, when forming the negative electrodes in 5% boric acid solution against graphite electrodes as when forming against positive lead electrodes. Operation with graphite electrodes has the further advantage that no lead precipitation can occur on the negative plates whereby a possible short circuit will be prevented with certainty.

It may be mentioned that the active mass or paste for the negative electrodes as used in the preceding examples consists of 98.8% of lead oxides and 1.2% of a mixture of barium sulfate, lamp-black, and organic expander.

Forming of the negative electrodes—with the exception of forming as described in Examples 8 to 10—is effected in sulfuric acid solution of a specific gravity of 1.06.

Of course, many changes and variations in the concentration of the boric acid solution, the solvents used for said boric acid, the various additions employed, the manner of impregnation, the temperature and duration of impregnation and drying, and other impregnating conditions, the formation of the negative electrode plates by means of boric acid, and the like may be made by those skilled in the art in accordance with the principles set forth herein and in the claims annexed thereto.

I claim:

1. Formed negative sponge lead electrode for lead storage batteries, said electrode being stable on storage before use, said electrode, before discharge in use of a storage battery, containing boric acid in an amount between about 0.05% and about 1.5% of the sponge lead of the electrode, said boric acid being uniformly distributed throughout the porous structure of the sponge lead.

2. In a procss of producing formed negative electrodes for lead storage batteries, said electrodes being stable on storage before use, the steps which comprise forming the negative electrode plate, immersing the formed electrode plate into a solution containing between about 5 g. and about 100 g. of boric acid per liter of solution until the boric acid content of the electrode plate is between about 0.05% and about 1.5% of the sponge lead of the electrode, and drying the resulting boric acid-impregnated formed negative electrode before subsequent use and discharge in a storage battery.

3. In a process of producing formed negative electrodes for lead storage batteries, said electrodes being stable on storage before use, the steps which comprise forming the negative electrode plate, immersing the formed electrode plate at a temperature between about 55° C. and about 65° C. into a solution containing between about 5 g. and about 100 g. of boric acid per liter of solution until the boric acid content of the electrode plate is between about 0.05% and about 1.5% of the sponge lead of the electrode, and drying the resulting boric acid-impregnated formed negative electrode before subsequent use and discharge in a storage battery.

4. Formed negative sponge lead electrode for lead storage batteries, said electrode being stable on storage before use, said electrode, before discharge in use of a storage battery, being impregnated with boric acid in an amount sufficient to distribute the boric acid uniformly throughout the porous structure of the sponge lead and to prevent oxidation on drying and storing of said electrode.

5. In a process of producing formed negative electrodes for lead storage batteries, said electrodes being stable on storage before use, the steps which comprise forming a negative sponge lead electrode plate, immersing the formed electrode plate into a solution containing boric acid until the electrode is impregnated with boric acid and the boric acid is distributed uniformly throughout the porous structure of the sponge lead in an amount sufficient to prevent oxidation on drying and storing of said electrode, and drying the resulting boric acid-impregnated formed negative electrode before subsequent use and discharge in a storage battery.

6. The process according to claim 2, wherein the boric acid solution is a solution containing about 50 g. of boric acid per liter.

7. The process according to claim 2, wherein immersion is effected with the boric acid solution containing about 10 g. to 30 g. per liter of the boric acid solution, of a weakly acid organic substance having an oxidation retarding effect and selected from the group consisting of phenol and cresol.

8. The process according to claim 2, wherein immersion is effected with the boric acid solution containing about 10 g. to 30 g. per liter of the boric acid solution of methyl cellulose.

9. In the process of producing oxidation-resistant formed negative electrodes for lead storage batteries said electrodes being stable on storage before use, the steps which comprise forming negative electrodes in an acid electrolyte solution containing boric acid, the amount of boric acid present in said electrolyte being sufficient to incorporate between about 0.05% and about 1.5% of boric acid calculated for the sponge lead into the formed and dried electrode, and drying the formed electrodes before subsequent use and discharge in a storage battery.

10. In the process of producing oxidation-resistant formed negative electrodes for lead storage batteries said electrodes being stable on storage before use, the steps which comprise forming negative electrodes in a sulfuric acid electrolyte solution containing 3.2% of sulfuric acid and boric acid, the amount of boric acid present in said electrolyte being sufficient to incorporate between about 0.05% and about 1.5% of boric acid calculated for the sponge lead into the formed and dried electrode, and drying the formed electrodes before subsequent use and discharge in a storage battery.

11. In the process of producing oxidation-resistant formed negative electrodes for lead storage batteries said electrodes being stable on storage before use, the steps which comprise forming negative electrodes in an electrolyte solution containing aluminum sulfate and boric acid, the amount of boric acid present in said electrolyte being sufficient to incorporate between about 0.05% and about 1.5% of boric acid calculated for the sponge lead into the formed and dried electrode, and drying the formed electrodes before subsequent use and discharge in a storage battery.

12. In the process of producing oxidation-resistant formed negative electrodes for lead storage batteries said electrodes being stable on storage before use, the steps which comprise forming negative electrodes in an aqueous boric acid solution containing between about 5 g. and about 100 g. of boric acid per liter of solution and serving as electrolyte with counterelectrodes insoluble in said electrolyte, the amount of boric acid present in said electrolyte being sufficient to incorporate between about 0.05% and about 1.5% of boric acid calculated for the sponge lead into the formed and dried electrode, and drying the formed electrodes before subsequent use and discharge in a storage battery.

13. The process according to claim 12, wherein the counterelectrodes are electrodes selected from the group consisting of carbon and graphite electrodes.

References Cited in the file of this patent

UNITED STATES PATENTS

| | | |
|---|---|---|
| 458,425 | Lugo | Aug. 25, 1891 |
| 1,291,167 | Rueb | Jan. 14, 1919 |
| 1,652,945 | Klain | Dec. 13, 1927 |
| 2,649,766 | Johnson | Aug. 25, 1953 |
| 2,747,008 | Sundberg et al. | May 22, 1956 |
| 2,759,037 | Greenburg et al. | Aug. 14, 1956 |

FOREIGN PATENTS

| | | |
|---|---|---|
| 704,469 | France | Feb. 23, 1931 |